United States Patent [19]
Funahashi et al.

[11] Patent Number: 5,541,903
[45] Date of Patent: Jul. 30, 1996

[54] SYSTEM FOR ACCESSING A DISC DRIVE WITH DEFECT INFORMATION

[75] Inventors: Takeshi Funahashi, Saitama; Yoshikatsu Niwa, Kanagawa, both of Japan

[73] Assignee: Sony Corporation, Tokyo, Japan

[21] Appl. No.: 326,026

[22] Filed: Oct. 19, 1994

[30] Foreign Application Priority Data

Oct. 21, 1993 [JP] Japan ............................ 5-263885

[51] Int. Cl.$^6$ ................................................ G11B 7/00
[52] U.S. Cl. ............................. 369/54; 369/32; 369/58
[58] Field of Search ............................. 369/32, 54, 58, 369/48, 47, 124

[56] References Cited

U.S. PATENT DOCUMENTS

| | | | |
|---|---|---|---|
| 5,235,585 | 8/1993 | Bish et al. ........................... | 369/54 |
| 5,237,553 | 8/1993 | Fukushima et al. ................. | 369/32 |
| 5,271,018 | 12/1993 | Chan ..................................... | 369/32 |

*Primary Examiner*—Nabil Z. Hindi
*Attorney, Agent, or Firm*—Limbach & Limbach L.L.P.; Philip M. Shaw, Jr.

[57] ABSTRACT

A method of accessing a disc-shaped recording medium including the steps of (a) recording defect information on the disc-shaped recording medium including a first logical address data of defective sectors, the first logical address data being a serial logical address data assigned to all sectors including both effective and defective sectors, (b) recording on a predetermined physical location of the disc-shaped recording medium disc information containing recorded physical position information of the defect information which represents a physical data structure, (c) reading out the disc information from the disc-shaped recording medium, (d) reading out the defect information using the physical recorded position information contained in the disc information read out at step (c), (e) generating a first table using the defect information which is used to convert the first logical address data into a second logical address data, the second logical address data being an address data assigned only to the effective sectors, (f) generating a second table using the disc information read out at step (c) which is used to convert the second logical address data into a physical address data of the disc-shaped recording medium, (g) using the first table to convert the first logical address data to be accessed into the second logical address data, (h) using the second table to convert the second logical address data into the physical address data and (i) accessing the disc-shaped recording medium using the physical address data generated at step (h).

11 Claims, 16 Drawing Sheets

FIG. 2 (PRIOR ART)

| | 1Byte | 1Byte | 1Byte |
|---|---|---|---|
| Defect #1 | Physical Track No. | | Physical Sector No. |
| Defect #2 | Physical Track No. | | Physical Sector No. |
| Defect #3 | Physical Track No. | | Physical Sector No. |
| ⋮ | | | |
| Defect #n | Physical Track No. | | Physical Sector No. |

FIG. 3 (PRIOR ART)

| 1 Byte | 1 Byte | 1 Byte | 1 Byte |
|---|---|---|---|
| Defect #1 | Physical Track No. | Physical Sector No. | |
| Replacement Sector of Defect #1 | Physical Track No. | Physical Sector No. | |
| Defect #2 | Physical Track No. | Physical Sector No. | |
| Replacement Sector of Defect #2 | Physical Track No. | Physical Sector No. | |
| Defect #3 | Physical Track No. | Physical Sector No. | |
| Replacement Sector of Defect #3 | Physical Track No. | Physical Sector No. | |
| ⋮ | ⋮ | ⋮ | |
| Defect #n | Physical Track No. | Physical Sector No. | |
| Replacement Sector of Defect #n | Physical Track No. | Physical Sector No. | |

FIG. 8

| | |
|---|---|
| Start Track No. of Zone 0 | [0000] |
| Start Sector No. of Zone 0 | [00] |
| Number of Sectors of Zone 0 (Per Track) | [91] |
| Start Track No. of Zone 1 | [2000] |
| Start Sector No. of Zone 1 | [00] |
| Number of Sectors of Zone 1 (Per Track) | [80] |
| Start Track No. of Zone 2 | [4000] |
| Start Sector No. of Zone 2 | [00] |
| Number of Sectors of Zone 2 (Per Track) | [70] |
| Start Track No. of Zone 3 | [6000] |
| Start Sector No. of Zone 3 | [00] |
| Number of Sectors of Zone 3 (Per Track) | [60] |
| Start Track No. of Zone 4 | [8000] |
| Start Sector No. of Zone 4 | [00] |
| Number of Sectors of Zone 4 (Per Track) | [48] |
| Position of DDS#0 Track No. | [0100] |
| Position of DDS#0 Sector No. | [00] |
| Position of DDS#1 Track No. | [01] |
| Position of DDS#1 Sector No. | [13] |
| Position of DDS#2 Track No. | [27917] |
| Position of DDS#2 Sector No. | [00] |
| Position of DDS#3 Track No. | [27918] |
| Position of DDS#3 Sector No. | [13] |

FIG. 9

| 1Byte | 1Byte | 1Byte | 1Byte |
|---|---|---|---|
| Logical Defect Sector No. (#1) ||||
| Logical Defect Sector No. (#2) ||||
| Logical Defect Sector No. (#3) ||||
| Logical Defect Sector No. (#4) ||||
| Logical Defect Sector No. (#5) ||||
| ⋮ ||||
| Logical Defect Sector No. (#n) ||||

FIG. 10

| 1Byte | 1Byte | 1Byte | 1Byte |
|---|---|---|---|
| Logical Defect Sector No. (#1) ||||
| Logical Replacement Sector No. (#1) ||||
| Logical Defect Sector No. (#2) ||||
| Logical Replacement Sector No. (#2) ||||
| Logical Defect Sector No. (#3) ||||
| Logical Replacement Sector No. (#3) ||||
| Logical Defect Sector No. (#4) ||||
| Logical Replacement Sector No. (#4) ||||
| ⋮ ||||
| Logical Defect Sector No. (#n) ||||
| Logical Replacement Sector No. (#n) ||||

FIG. 11

| Serial Logical Address | Physical Address |
|---|---|
| 0 | Track 0/Sector 0 |
| 182000 | Track 2000/Sector 0 |
| 342000 | Track 4000/Sector 0 |
| 482000 | Track 6000/Sector 0 |
| 602000 | Track 8000/Sector 0 |

FIG. 12

| Request Logical Address | Serial Logical Address |
|---|---|
| 0 | 75 |
| 20000 | 20076 |
| 30000 | 249900 |
| 30001 | 30077 |

SYSTEM FOR ACCESSING A DISC DRIVE WITH DEFECT INFORMATION

BACKGROUND OF THE INVENTION

1. Field of the Invention

The present invention relates to a method of accessing a disc-shaped recording medium for use with an optical disc drive or the like, for example.

2. Description of the Prior Art

Disc drives have hitherto been proposed to record data on an optical disc, such as a magnetooptical disc and a write-once optical disc, and to reproduce recorded data from the optical disc. Disc drives are now widely used as devices for storing computer data and audio-visual data.

As a format of such optical disc, there is known a so-called zone constant angular velocity (CAV) system which records and/or reproduces data on and/or from an optical disc at clock rates different in each zone in a plurality of zones divided along the radius direction of the optical disc by rotating the optical disc at the CAV. The same assignee of the present application has previously proposed this zone CAV system (see Japanese laid-open patent publication No. 5-54540).

Optical disc media used in the zone CAV system are not satisfactory in error rate as compared with magnetic discs. To solve this problem, the optical disc employs an error correction code (ECC) which is more powerful than that used in the magnetic disc and two processing algorithms are proposed for defect sectors. One processing algorithm is what might be called a sector slipping algorithm (SSA) and another is what might be called linear replacement algorithm (LRA).

The SSA designates the sector of a defect sector as a replacement sector and uses the replacement sector instead of the defect sector when optical discs are initialized upon manufacturing. Accordingly, when data is written in and/or read out from the data block, a data transfer rate is not decreased substantially. If the replacement sector is not accessed upon first access, the replacement sector can be accessed when the optical disc is rotated once. SSA information, i.e., information representing the original sector of the sector of the replacement sector is generated when the optical disc is initialized in the manufacturing process and recorded on a predetermined position of the optical disc.

According to the LRA, when data is written in the optical disc in actual practice, written data is read out from the optical disc. It is verified whether or not the read-out data and the written data with each other. Then, a replacement sector of a defect sector is designated on a track determined as a replacement sector area. LRA information, i.e., information representing the original sector of the sector of the replacement sector, is recorded on the optical disc not only when data is written on the optical disc but also when the optical disc is initialized in use.

The SSA information and the LRA information are recorded on predetermined areas of the optical disc. Specifically, disc definition structure (DDS) information, primary defect list (PDL) information and secondary defect list (SDL) information are recorded on predetermined areas of the optical disc. The DDS information is data showing data structure of the optical disc and includes PDL start address data and SDL start address data. The PDL information is data concerning sectors which are replaced according to the SSA. The SDL information is data concerning sectors which are replaced according to the IRA. The DDS information, the SSA information and the LRA information will be collectively referred to hereinafter as "defect information".

The defect information is recorded on the optical disc totally in four positions. Two of the positions are near the outermost periphery and two of the positions are near the innermost periphery in order to detect a new defect sector when the optical disc is initialized in the manufacturing process or when the optical disc is initialized after the optical disc has been manufactured.

If it is determined by simultaneous verification that sectors of the above-mentioned four positions are all defect sectors when the defect information is recorded on the optical disc, then such an optical disc is determined to be a defect optical disc.

An example of the format of the conventional optical disc will be described with reference to FIGS. 1 to 4.

FIG. 1 of the accompanying drawings, shows a physical track Ta1 of the starting portion, where information DDS#0 is recorded on a physical sector 0, information PDL#0 is recorded on a physical sector 1, and information SDL#0 is recorded on a physical sector 2 of a physical track 0, respectively. Information DDS#1 is recorded on a physical sector 12, information PDL#1 is recorded on a physical sector 13, and information SDL#1 is recorded on a physical sector 14 of a physical track 1, respectively.

Physical track Ta2 of the ending portion, is also shown wherein information DDS#2 is recorded on a physical sector 0, information PDL#2 is recorded on a physical sector 1, and information SDL#2 is recorded on a physical sector 2 of a physical track 9998, respectively. Information DDS#3 is recorded on a physical sector 12, information PDL#3 is recorded on a physical sector 13, and information SDL#3 is recorded on a physical sector 14 of a physical track 9999.

Tracks and sectors that are respectively referred to as "physical tracks" and "physical sectors" represent physical positions of tracks and sectors on the optical disc directly. DDS#1 to DDS#3 are informations representing the same thing but DDS#1 to DDS#3 are different in value because DDS#0 to DDS#3 also contain information representing recorded positions of the corresponding PDL#0 to PDL#3 and SDL#0 to SDL#3. In other words, information PDL#0 and information PDL#1 are recorded on the optical disc at different positions.

This is also true in the information PDL and the information SDL. The defect information is recorded on the optical disc at the four positions described above. The reason for this is that, if information that was recorded only on one position of the optical disc was not read out therefrom, the optical disc would become useless.

FIG. 2 is a schematic diagram used to explain an example of the format of the information PDL. As shown in FIG. 2, the information PDL is a table composed of physical track Nos. (3 bytes) and physical sector Nos. (1 byte) provided at every defect #1 to #n in response to the defects #1 to #n. The physical track Nos. depict the physical track Nos. of the defects #1 to #n, and the physical sector Nos. depict the physical sector Nos. of the defects #1 to #n.

FIG. 3 is a schematic diagram used to explain an example of the format of the information SDL. As shown in FIG. 3, the information SDL is a table composed of physical track Nos. (3 bytes) and physical sector Nos. (1 byte) provided at every defect #1 to #3 in response to the defects #1 to #n, physical track Nos. (3 bytes) and physical sector Nos. (1 byte) of replacement sectors provided at every defect #1 to #3.

Operation of the conventional optical disc drive will be described below with reference to the flowchart in FIG. 4.

Referring to FIG. 4, following the start of operation, a host computer outputs a logical address at step S1. The optical disc drive reads out defect information recorded on the optical disc when the optical disc is loaded thereto or when the optical disc drive is energized and generates a conversion table. Then, the processing proceeds to step S2.

In step S2, a physical address is calculated from address data based on the conversion table. A central processing unit (CPU) calculates a physical address of the optical disc based on the logical address supplied thereto from the host computer and the conversion table. The conversion table is used to directly convert the logical address supplied from the host computer to physical address. Then, the processing proceeds to step S3.

In step S3, the physical address is supplied to the optical disc drive and then, the processing routine is ended. The CPU supplies the physical address obtained at step S2 to a servo controller. The servo controller moves a pickup device by energizing a driver unit based on the physical address supplied thereto from the CPU and energizes the pickup device to start reading and/or writing. When the pickup device reads out digital data from the optical disc, data obtained by the pickup device is supplied to the host computer.

A wide variety of patent applications concerning the zone CAV system have been made but they have not yet been put into practice.

When an optical disc apparatus of zone CAV system is realized, defect sectors should be handled similarly to the prior art. Specifically, the address requested by the host computer has to be converted to an address on the disc surface of the optical disc, i.e., a physical address which considers the number of sectors of one track which changes at every defect sector and zone.

Therefore, if the address requested by the host computer is directly converted into the physical address similarly to the prior art, then calculation becomes very complicated.

As a result, programming for the host computer becomes enormous and a processor with high throughput is required to process such enormous programming. Further, if a processor with low throughput is used, then it takes a lot of processing time.

If data to be handled is data such as audio-visual data that requires a medium of large capacity, then it is suggested that the capacity of the optical disc be increased without increasing the diameter of the optical disc. However, at present, even though the capacity of the optical disc can be increased, such optical discs cannot be made compatible with the existing optical disc drive and an optical disc drive that is exclusively-designed for such optical disc should be developed.

When the CAV system is adopted and defect information is recorded totally in four positions, two of which are on the outermost periphery and two on the, innermost periphery of the optical disc, there is then the large possibility that the innermost peripheral portion of the optical disc will be damaged so that defect information recorded on the portion near the outermost peripheral portion of the optical disc cannot be read out. Further, recording density is increased in the innermost peripheral portion of the optical disc so that yield in the portion near the innermost peripheral portion is poor. There is then the large possibility that defect information recorded on the portion near the innermost peripheral portion of the optical disc cannot be read out. Specifically, there is then the very large probability that the optical disc will become a defect disc.

Moreover, it is customary that optical discs that become defect discs are discarded. This is not preferable from a natural resources saving standpoint.

OBJECTS AND SUMMARY OF THE INVENTION

In view of the aforesaid aspects, it is an object of the present invention to provide a method of accessing a disc-shaped recording medium in which a request address from a host computer can be converted into a physical address with ease even in an optical disc apparatus of a zone CAV system.

It is another object of the present invention to provide a method of accessing a disc-shaped recording medium in which an optical disc can be used even when any of the defect information recorded on any one of four positions of an optical disc cannot be reproduced.

According to a first aspect of the present invention, there is provided a method of accessing a disc-shaped recording medium which includes the steps of: recording defect information on the disc-shaped recording medium, recording disc information containing physically recorded position information of the defect information which represents a physical data structure on the disc-shaped recording medium at its predetermined physical position, reading out the disc information from the disc-shaped recording medium, generating, based on the disc information read out, a first table with which second logical address data with address corresponding to a defect position removed as compared with first logical address data which is converted to physical address data and vice versa, reading out the defect information based on the physically recorded position information contained in the disc information read out, generating, based on the defect information, a second table with which the second logical address data is converted to the first logical address data and vice versa, converting the first logical address data to the second logical address data on the basis of the second table, converting the second logical address data to the physical address data on the basis of the first table, and accessing the disc-shaped recording medium on the basis of the physical address data.

According to a second aspect of the present invention, there is provided a method of accessing a disc-shaped recording medium which comprises the steps of: reading out disc information from a disc-shaped recording medium in which defect information based on a first logical address and the disc information containing recorded position information of the defect information and which represents a physical data structure are recorded, generating a first table which is based on the disc information read out wherein second logical address data with addresses corresponding to a defect position removed as compared with first logical address data is converted to physical address data and vice versa, reading out the defect information based on the physically recorded position information contained in the disc information read out, generating based on the defect information a second table based on the defect information wherein the second logical address data is converted to the first logical address data and vice versa, converting the first logical address data to the second logical address data on the basis of the second table, converting the second logical address data to the physical address data on the basis of the first table, and accessing the disc-shaped recording medium on the basis of the physical address data.

The above and other objects, features and advantages of the present invention will become apparent from the following detailed description of illustrative embodiments when read in conjunction with the accompanying drawings.

BRIEF DESCRIPTION OF THE DRAWINGS

FIG. 2 is a schematic diagram used to explain an example of an information PDL according to the prior art;

FIG. 3 is a schematic diagram used to explain an example of an information SDL according to the prior art;

FIG. 8 is a diagram showing an example of disc information;

FIG. 9 is a diagram showing an example of a PDL;

FIG. 10 is a diagram showing an example of an SDL;

FIG. 11 is a diagram showing an example of a first conversion table;

FIG. 12 is a diagram showing an example of a second conversion table;

DETAILED DESCRIPTION OF THE PREFERRED EMBODIMENTS

A method of accessing a disc-shaped recording medium according to a first embodiment of the present invention will be described with reference to FIG. 5.

Figure 5:
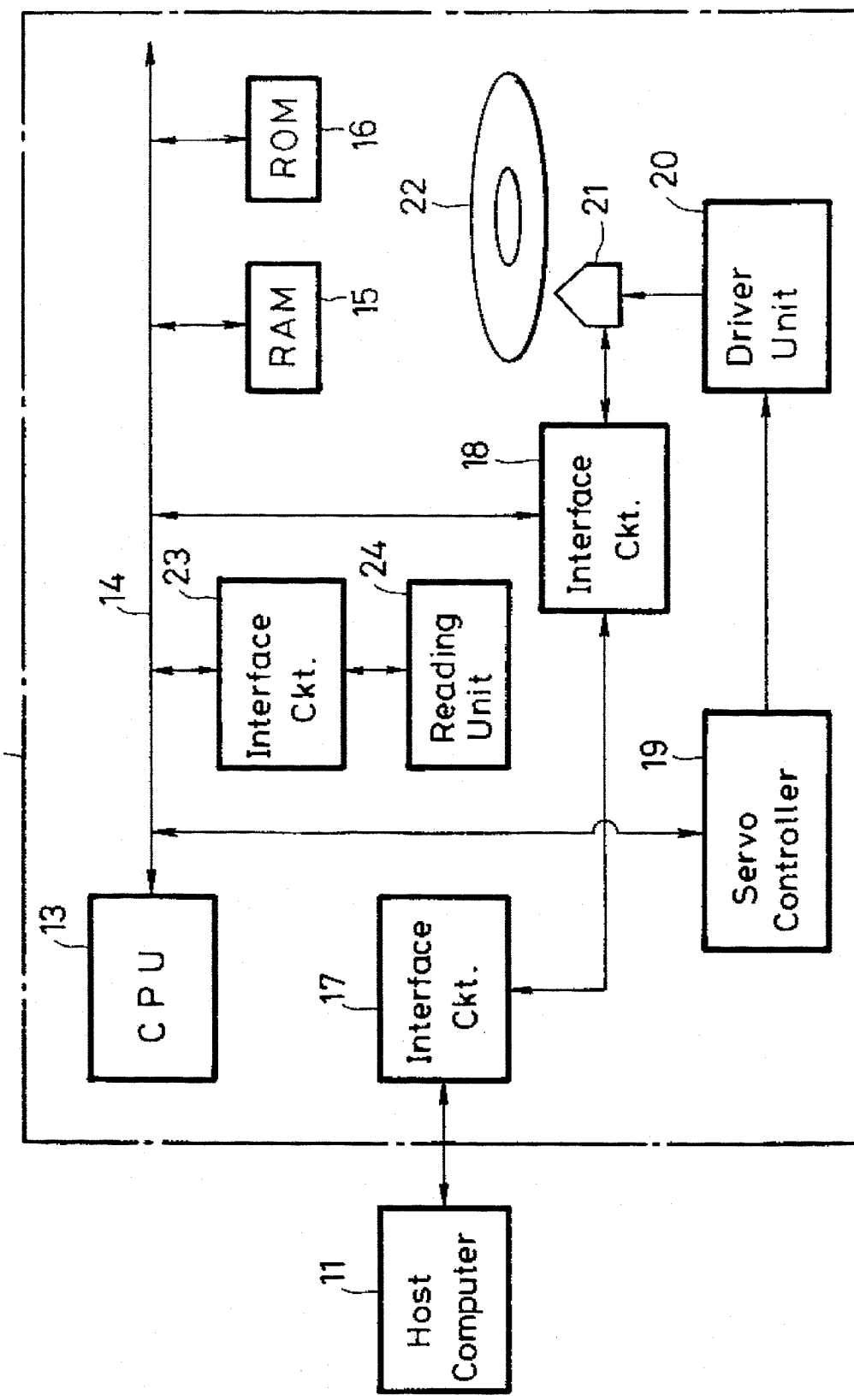
FIG. 5 is a schematic block diagram showing an example of an optical disc drive to which a method of accessing a disc-shaped recording medium according to a first embodiment of the present invention is applied.

FIG. 5 is a block diagram showing a circuit arrangement of an optical disc drive to which the method of the present invention is applied.

As shown in FIG. 5, a host computer 11 is connected to an optical disc drive 12. In the optical disc drive 12, a CPU 13 is connected with a bus 14 composed of an address bus, a data bus and a control bus. The bus 14 is connected with a random access memory (RAM) 15 which serves as a work area, a read only memory (ROM) 16 in which program and various parameters are memorized, an interface circuit 18 and a servo controller 19. The interface circuit 18 is connected with a pickup device 21 and an interface circuit 17. The servo controller 19 is connected with a drive unit 20 and the pickup device 21. A mechanism for moving a spindle motor and the pickup device 21 in the radius direction of an optical disc 22 is not shown for the sake of simplicity.

An interface circuit 23 and a recorded position information reading unit 24 relate to a second embodiment of the present invention and will be described in detail later on with reference to FIGS. 18 and 19.

Before describing operation of the optical disc drive 12 shown in FIG. 5, a format of the optical disc 22 which is applied to the present invention will be described with reference to FIGS. 6 to 15.

Figure 1:
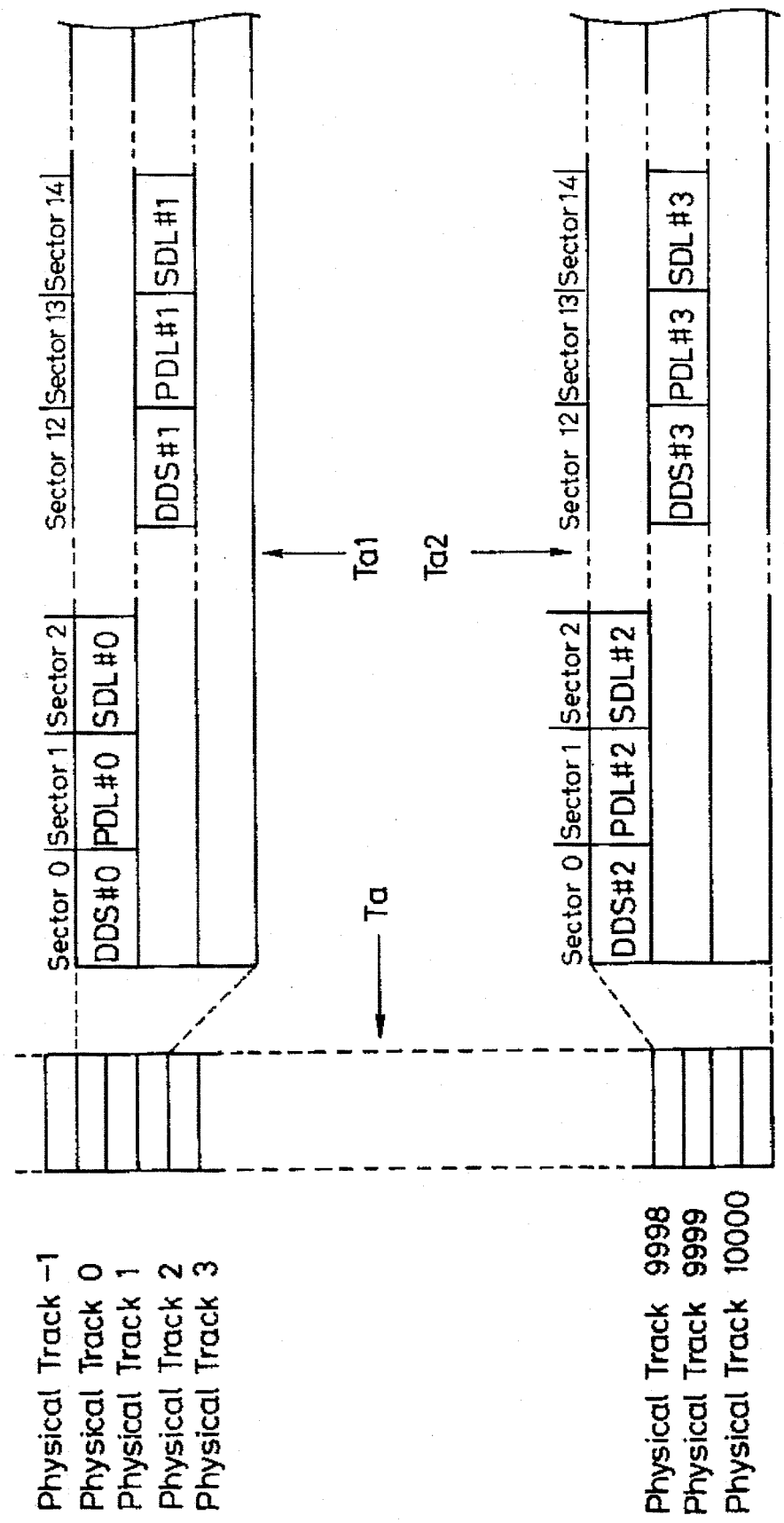
FIG. 1 is a schematic diagram used to explain the recorded position of defect information according to the prior art.
Figure 4:
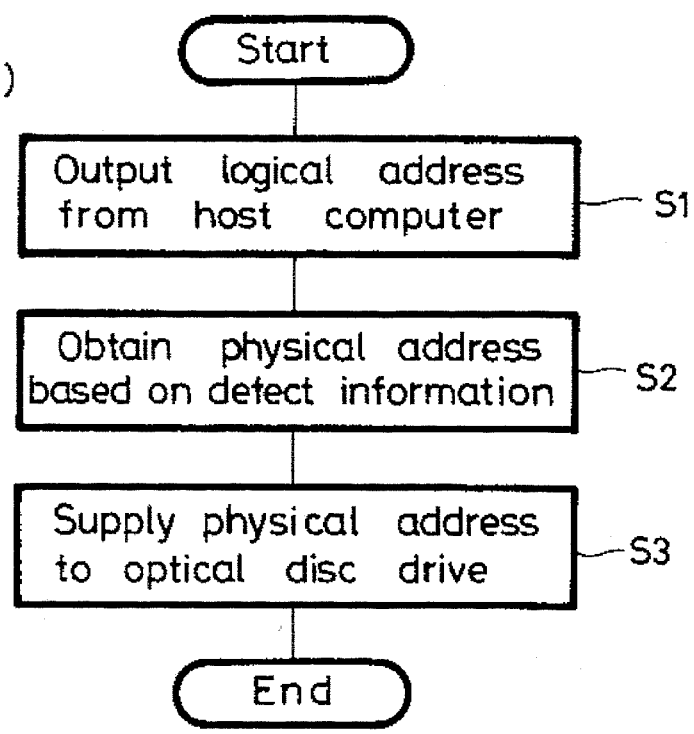
FIG. 4 is a flowchart to which reference will be made in explaining the operation of a conventional optical disc drive.
Figure 6:
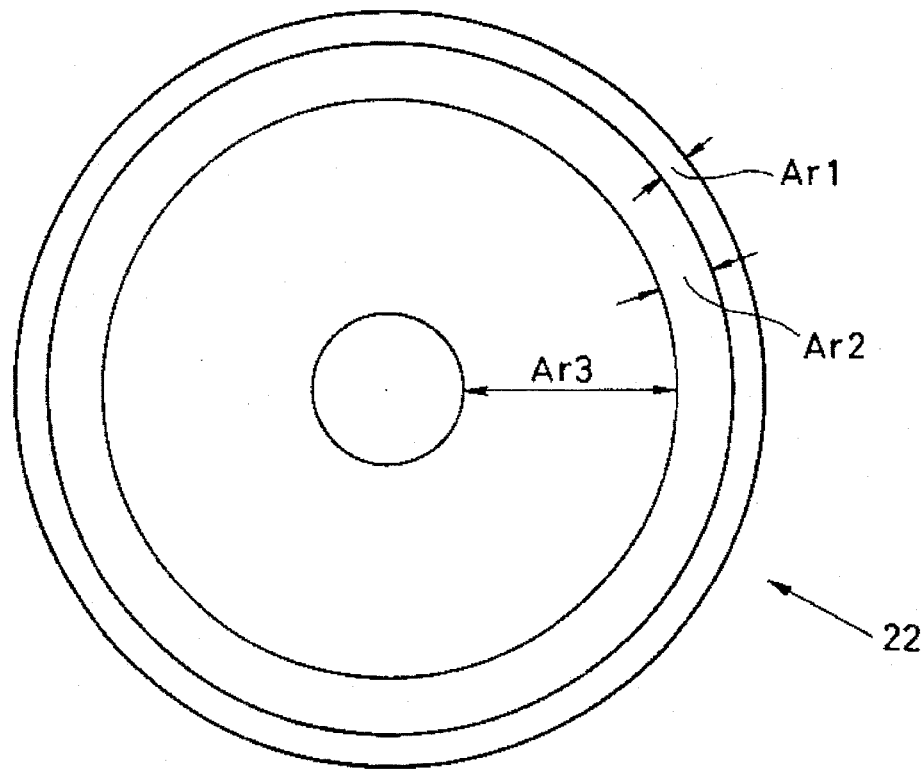
FIG. 6 is a diagram showing an example of a format of an optical disc used by the optical disc drive shown in FIG. 5.

FIG. 6 shows an example of the optical disc 22 which is divided along the radius direction thereof to provide a plurality of areas which will be described below. In FIG. 6, reference symbol Ar1 depicts an outermost peripheral area. Reference symbol Ar2 depicts an area which is what might be called a minus track in which disc information representing an optical disc structure (e.g., zones, etc.) is recorded a plurality of times in addition to position information representing the position of the defect information. Reference symbol Ar3 depicts a user area in which a logical address, which will be described later, is set.

Figure 7:
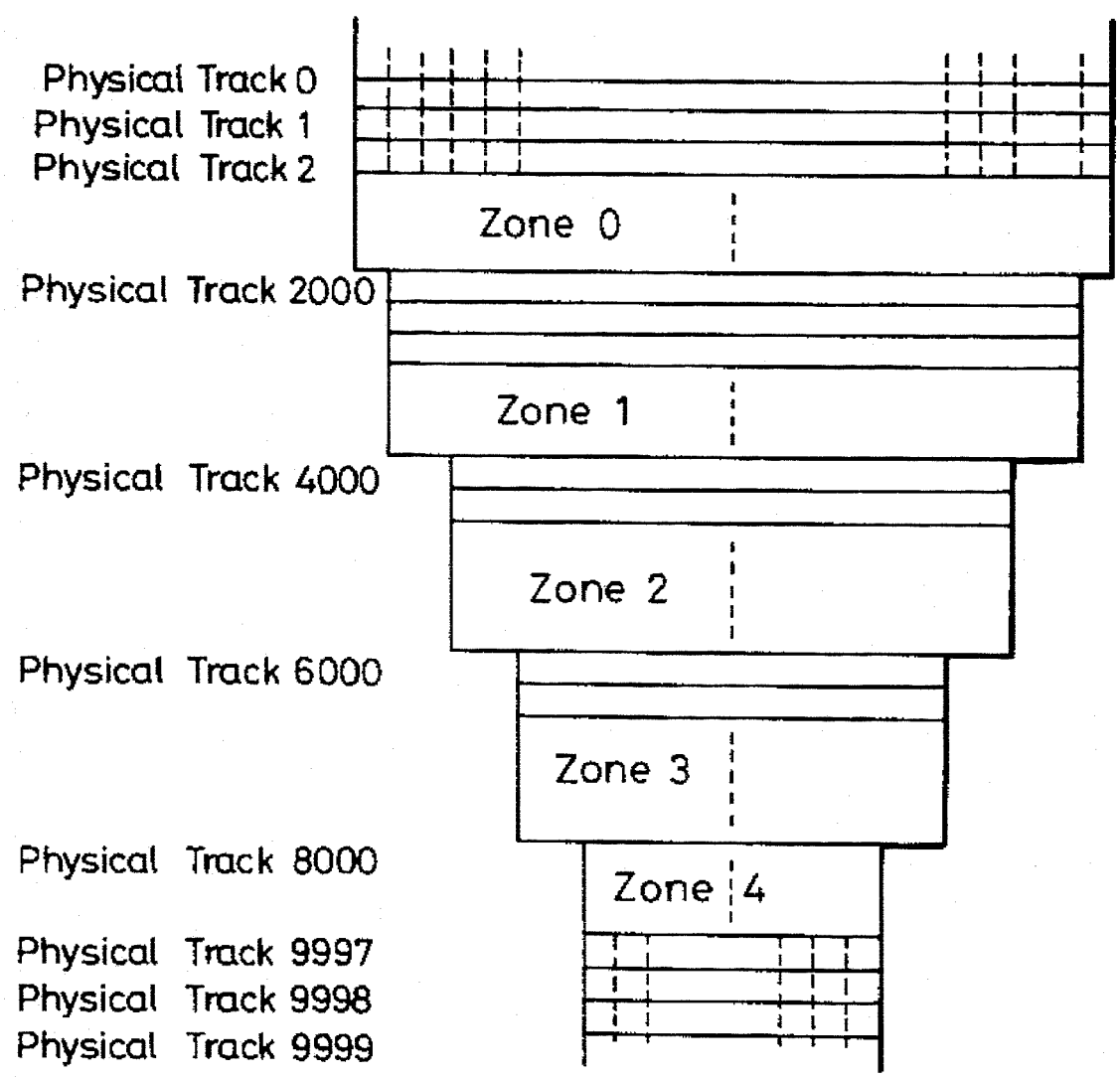
FIG. 7 is a diagram showing an example of a zoning format of the optical disc.

FIG. 7 is an explanatory diagram showing an example of a zoning format of the optical disc 22. In this embodiment, as shown in FIG. 7, a zone 0 is composed of physical tracks 0 to 1999, a zone 1 is composed of physical tracks 2000 to 3999, a zone 2 is composed of physical tracks 4000 to 5999, a zone 3 is composed of physical tracks 6000 to 7999 and a zone 4 is composed of physical tracks 8000 to 9999. The zone 0 is located at the outermost periphery of the user area Ar3 of the optical disc 22 and the zone 4 is located at the innermost periphery of the user area Ar3 of the optical disc 22. Upon recording, digital data is recorded on the optical disc 22 at different clock rates such that recording density is progressively increased from the zone 0 to the zone 4 in that order.

FIG. 8 is an explanatory diagram showing an example of disc information recorded on the area Ar2 of the optical disc 22, i.e., on the optical disc 22 at its outer peripheral side of the zone 0. The same disc information is recorded on all sectors (e.g., 16 tracks×25 sectors 400 sectors) ranging from the minus track "−1" to the minus track "−16" of the area Ar2. This disc information is generated and recorded on the optical disc when the optical disc is initialized in the manufacturing process. Accordingly, if even one sector of 400 sectors cannot be read, then that optical disc is determined to be a defect disc.

The disc information is recorded on the optical disc many times as compared with the information DDS or the like. There is then the small possibility that the optical disc will become a defect disc. Minus-tracks of the area Ar2 are formed such that the values (physical track Nos.) of the track Nos. become progressively smaller in much the same way as in "−1" to "−16" as the physical sector is returned from the physical sector 0 of the physical track #0 to the track closest to the outer periphery with respect to the physical sector 0 of the physical track #0 of the user area Ar3 of the optical disc 22. Conversely, the physical track Nos. are assigned to the tracks from the outer peripheral side to the inner peripheral side of the optical disc 22 in such order of "−16", "−15", ... "−1", "0", "1", ... "n". The above-mentioned disc information is recorded on the optical disc 22 as the minus-track of the area Ar2 from the physical track Nos. "−1" to "−16".

FIG. 8 shows an example of the disc information. The example in FIG. 8 shows that the physical start track No. of the zone 0 is "0000", the physical start sector No. of the zone 0 is "00", the physical sector number of the zone 0 is "91", the physical start track No. of the zone 1 is "2000", the physical start sector No. of the zone 1 is "00", the physical sector number of the zone 1 is "80", the physical start track No. of the zone 2 is "4000", the physical start sector No. of the zone 2 is "00", the physical sector number of the zone 2 is "70", the physical start track No. of the zone 3 is "6000", the physical start sector No. of the zone 3 is "00", the physical sector number of the zone 3 is "60", the physical start track No. of the zone 4 is "8000", the physical start sector No. of the zone 4 is "00" and the physical sector number of the zone 4 is "48".

As shown in FIG. 8, a physical track No. and a physical sector No. representing the position of the information DDS may be recorded. As shown in FIG. 8, the physical track No. of DDS#0 is "0100", the physical sector No. of DDS#0 is "00", the physical track No. and the physical sector No. of DDS#1 are "01" and "13" respectively.

Specifically, the physical start track No. of each zone, the physical sector No. of each zone and the physical sector number of each zone of the optical disc 22 are recorded according to the format shown in FIG. 7. Each of the above-mentioned data becomes information inherent in each of the kinds and formats of the optical disc.

Serial logical address will be described prior to defect information. The serial logical address adds the sector Nos. to all physical sectors incrementally with respect to address 0 composed of track 0 and sector 0 of the physical address. Accordingly, the serial logical address includes values to be added to sectors, such as defect sectors, which cannot be accessed in actual practice.

Defect information will be described with reference to the serial logical address. In this embodiment, DDS is composed of 2-byte information wherein 0th byte-information and 1st-byte information depict ID information and 3rd-byte information depicts information representing the disc state. This information contains information representing starting sectors of the PDL and the SDL. Further, data following 4th-byte contains information, such as most significant bit (MSB), least significant bit (LSB) or the like.

The PDL contains information representing a serial logical sector No. of the defect sector processed by the ID and SSA. The SDL contains the serial logical sector No. of the defect sector processed by the LRA and the serial logical sector No. of the replacement sector of the defect sector. PDL and SDL differ from each other in information amount depending on the number of defect sectors. For this reason, DDS contains information which represents the starting sectors of the PDL and SDL by the serial logical sector Nos.

The PDL indicates information of a sector which is replaced by the SSA after the defect sector was detected by inspection in the disc manufacturing process. The SDL indicates information of a sector which is replaced by the LRA when information is read out from and/or written in the optical disc. When information is read out from and/or written in the optical disc, the SDL information is updated and overwritten on the same area of the optical disc if a defect sector is detected on each.

FIG. 9 shows an example of a PDL. In this embodiment, unlike the conventional physical address, the logical defect sector No. is recorded based on the serial logical address as a PDL. 4 bytes are assigned to information of one logical defect sector No. The example in FIG. 9 shows a logical PDL composed of logical defect sector Nos. ranging from #1 to #n.

An SDL will be described with reference to FIG. 10. In this embodiment, unlike the conventional physical address, the logical defect sector No. and the logical replacement sector No. are recorded based on the serial logical address as SDL similarly to the PDL. This example shown in FIG. 10 shows the logical SDL composed of the logical defect sector No. of #1, the logical defect sector No. of the logical replacement sector No. of #n and the logical replacement sector No.

FIGS. 11 and 12 show examples of first and second conversion tables, respectively. Each of the first and second conversion tables is composed of logical addresses and physical addresses. When the optical disc 22 is loaded onto the optical disc drive 12 shown in FIG. 5, the CPU 13 generates the first conversion table shown in FIG. 11 on the basis of disc information shown in FIG. 8. The CPU 13 recognizes the position of defect information based on the first conversion table and reads out defect information from the position recognized. Then, the CPU 13 generates the second conversion table shown in FIG. 12 based on defect information serving as the disc information read out.

The first conversion table is used to convert a serial logical address to a physical address. The second conversion table is used to convert a request logical address from the host computer 11 to a serial logical address which is used to convert the serial logical address to a physical address. In actual practice, the second conversion table shown in FIG. 12 is used to convert an address offset by a shift amount in the recording area of defect information to a serial logical address based on the request address from the host computer 11. When the replacement area in the LRA is provided in each zone, the offset amount of the replacement area is added to the serial logical address.

The first conversion table shown in FIG. 11 will be best understood when compared with the tables shown in FIGS. 8 and 9. In FIG. 11, a physical address "track 0/sector 0" is assigned to the serial logical address. The physical address is the information obtained from the disc information shown in FIG. 9 and indicates a starting address of the zone 0 shown in FIG. 8. A physical address "track 2000/sector 0" is assigned to a serial logical address "182000". The physical address is the information obtained from the disc information shown in FIG. 9 and indicates the starting address of the zone shown in FIG. 8.

This is also true in serial logical addresses "342000", and "602000" which represent starting addresses of zones, respectively.

The second conversion table shown in FIG. 12 is a logical table made after defect information has been read. "Request logical addresses" shown on the second conversion table of FIG. 12 are generated by adding an offset of the area used by defect information, i.e., 3 tracks to the sector No. data and the sector length data supplied thereto from the host computer 11. When the replacement sector in the LRA is set to each zone, an offset of the replacement sectors is added to the sector No. data and the sector length data. When the replacement sector in the LRA is set to the inside of the whole zones, such offset is not produced.

The address conversion method using the conversion tables shown in FIGS. 11 and 12 will be described with reference to FIG. 13.

Figure 13:
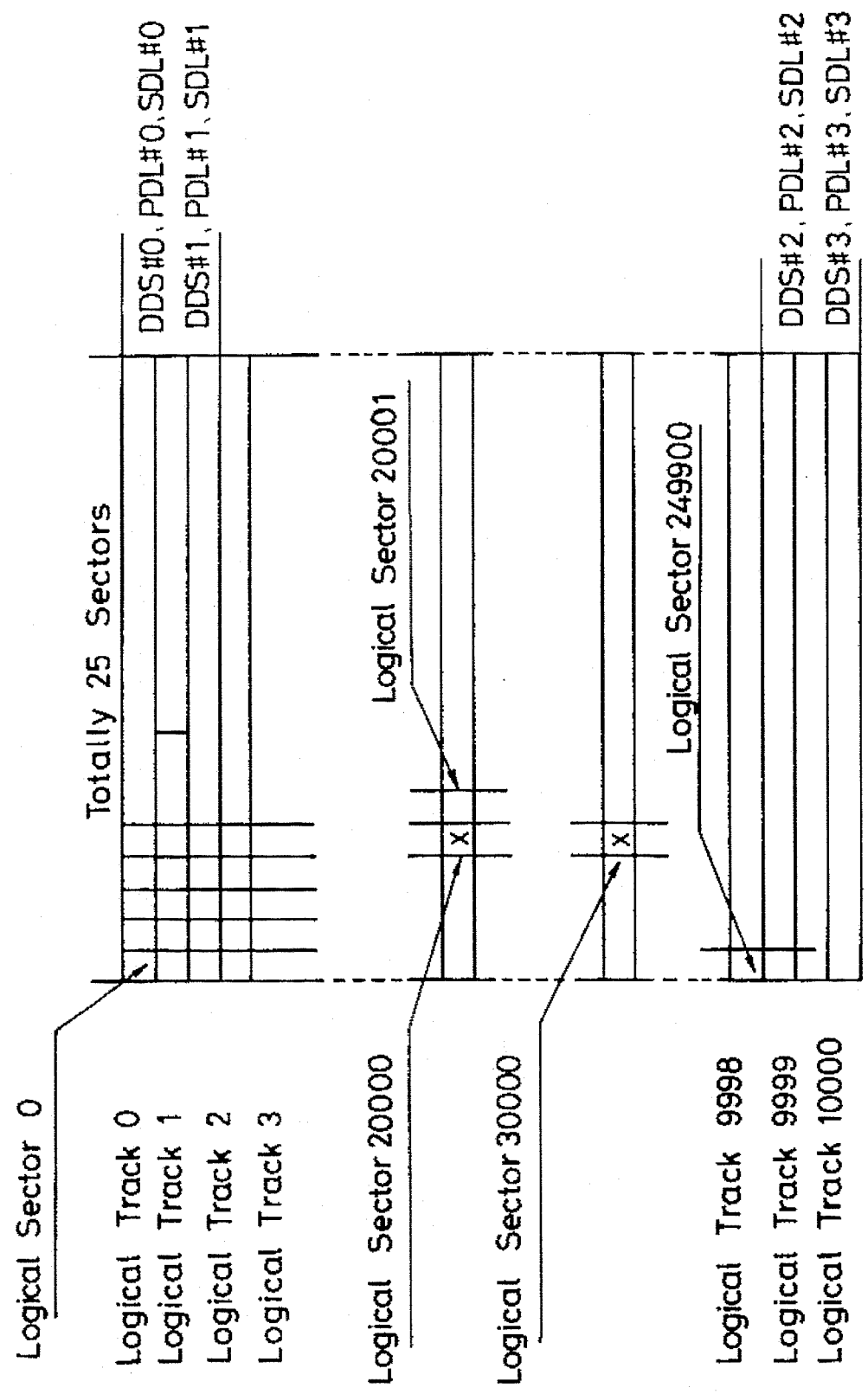
FIG. 13 is a diagram used to explain defect information in logical tracks and defect states.

Logical tracks shown in FIG. 13 do not exist in actual practice and are provided in order to simplify the description. FIG. 13 shows that serial logical sectors are mapped under the assumption that one track has 25 sectors.

In FIG. 13, a logical sector 20000 is a defect sector and processed by a replacement sector according to the SSA. A logical sector 30000 also is a defect sector and processed by a replacement sector according to the LRA.

The defect information is recorded on the optical disc 22 from a logical track 0 to a logical track 2 (total number of sectors is "75") and from a logical track 9998 to a logical track 10000 (total number of sectors is "75").

Values on the second conversion table shown in FIG. 12 correspond to the states shown in FIG. 13. The request logical address "0" on the second conversion table corresponds to a serial logical address "75". Because the area of 75 sectors between the logical track 0 and the logical track 2 is used as an area of defect information (DDS#0, PDL#0, SDL#0, DDS#1, PDL#1, SDL#1), there is an offset of 3 tracks (=75 sectors).

A serial logical address that corresponds to the request logical address "1" is "76". Address conversion will hereinafter be carried out similarly, and a serial logical address that corresponds to the request logical address "19999" will be "20074".

As shown in FIG. 13, since a defect x exists in a serial logical address "20075" that corresponds to the request logical address "20000", the request logical address "20000", is replaced with the serial logical address "20076", according to the SSA. Accordingly, as shown in FIG. 12, on the second conversion table, a serial logical address that corresponds to the request logical address "20000" will be "20076".

A serial logical address that corresponds to a request logical address "20001" is "20007". Address conversion will hereinafter be carried out similarly and a serial logical address that corresponds to the request conversion address "29999", will be "30075".

As shown in FIG. 13, since the defect x exists in the serial logical address "30076", the request logical address "30000" is replaced with a serial logical address "249900".

Accordingly, in the second conversion table, the serial logical address that corresponds to the request logical address "30000" is set to the serial logical address "249900".

In this case; since the LRA replacement processing causes the next sector to again become the next address of the defect sector, a serial logical address "30077" that corresponds to the next request logical address "30001" is memorized in the table.

No defect sector will be there and no table data will exist. However, the serial logical address that corresponds to the request logical address "30002" will be "30078". Thus, the following values are set sequentially.

Then, defect information (DDS#2, PDL#2, SDL#2, DDS#3, PDL#3, SDL#3) is recorded on the area of 75 sectors ranging from the logical track 9998 to the logical track 9999.

The first and second conversion tables are used as follows.

Specifically, it is possible to obtain the request logical address by adding the offset of 3 tracks (75 sectors) to the sector No. data and the sector length data supplied from the host computer 11 by the logical track based on the defect information. This request logical address is converted by the second conversion table to the serial logical address. This serial logical address is converted by the first conversion table to a physical address. The optical disc is accessed by this physical address. Accordingly, the serial logical address of the second conversion table corresponds to the serial logical address of the first conversion table.

A method of recording defect information on other sectors of the optical disc 22 when a sector in which the defect information of the optical disc 22 is recorded as a defect sector will be described with reference to FIGS. 14 and 15.

Figure 14:
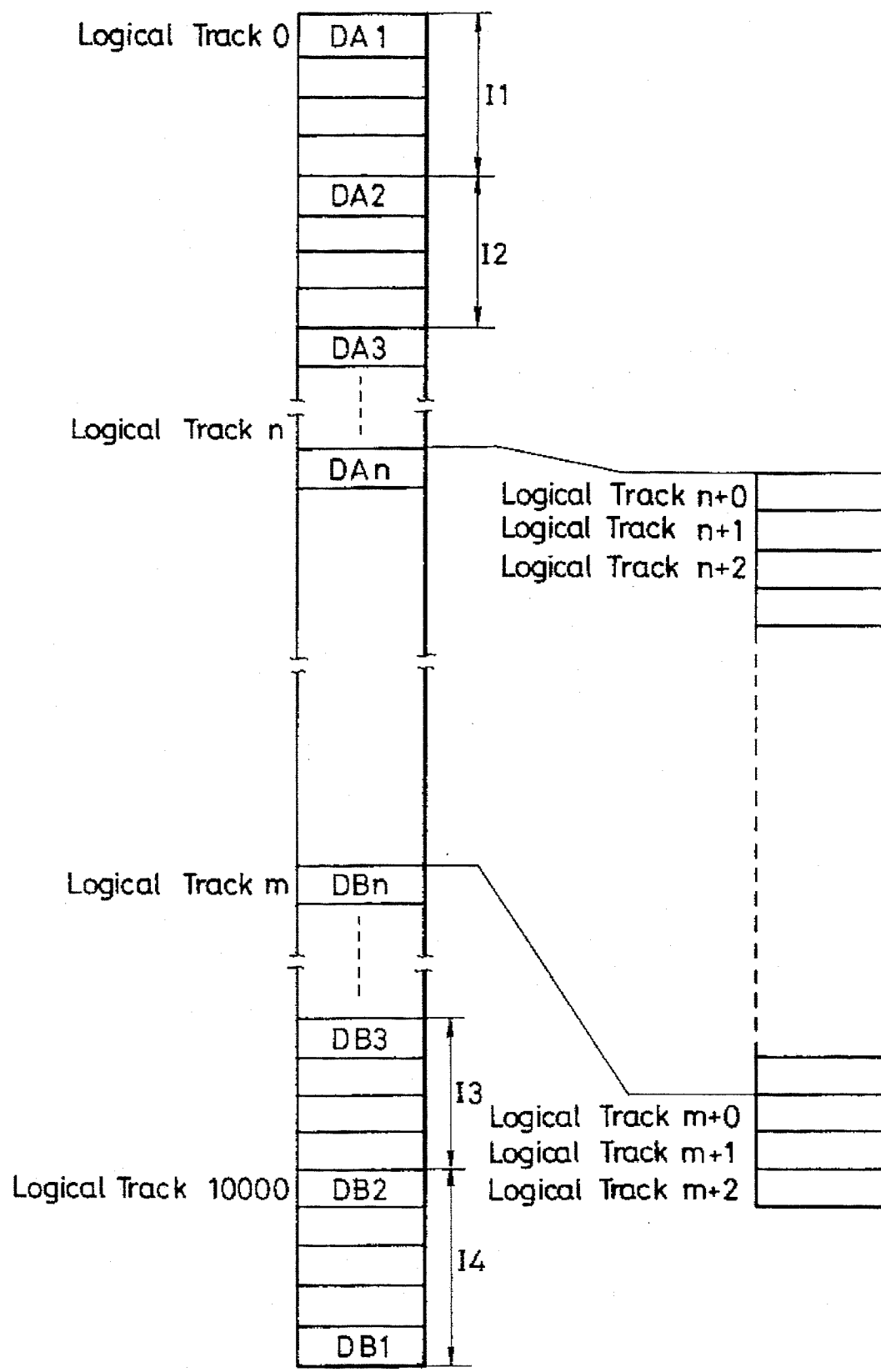
FIG. 14 is a diagram showing an arrangement of a logical track.
Figure 15:
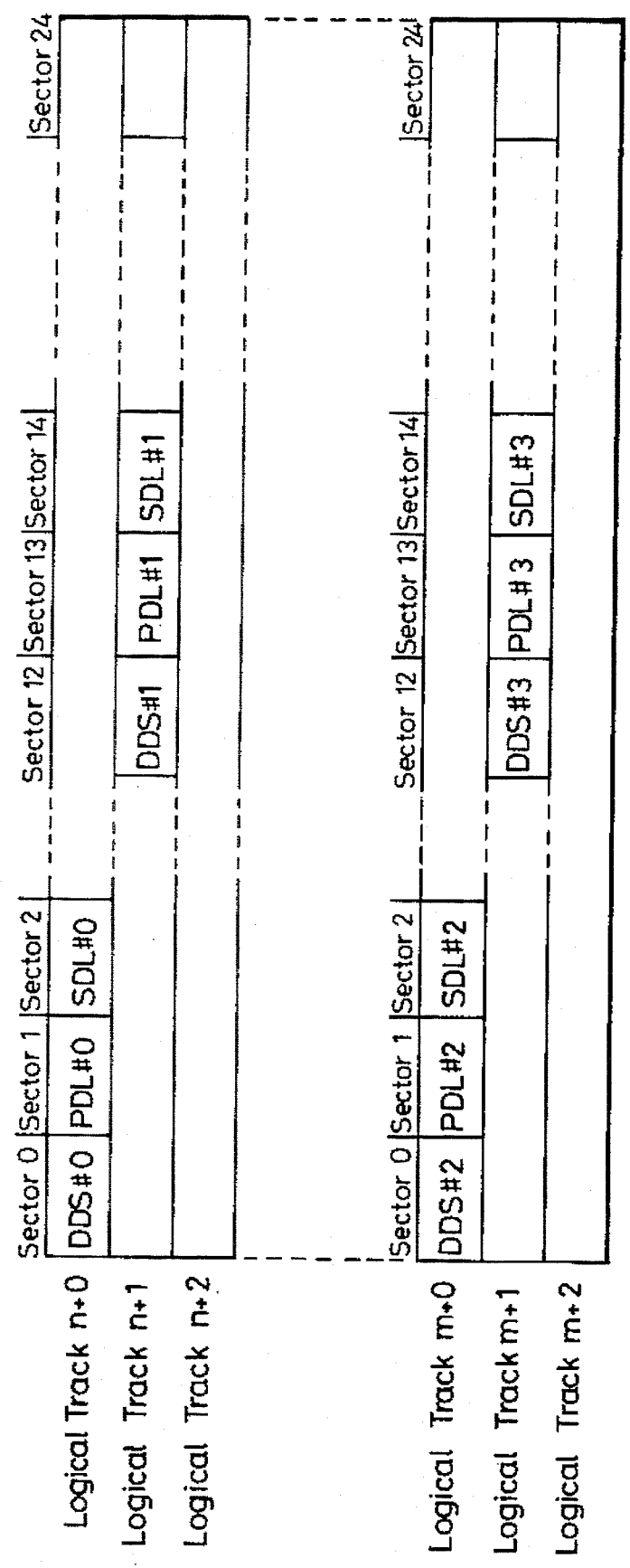
FIG. 15 is a diagram showing the position of defect information in the logical track.

In FIG. 14, reference symbol DA1 depicts a first logical track of a defect information recording area provided at two positions of the outer peripheral side of the optical disc 22. Reference symbol DB1 depicts a first logical track of a defect information recording area provided at two positions of the inner peripheral side of the optical disc 22. Reference symbols DA2 to Dan and DB2 to DBn depict areas that are used as replacement areas when the logical tracks DA1 and DB1 are defect areas.

Specifically, when the defect information recording area DA1 or DB1 is the defect area, defect information is recorded on the area DA2 or DB2. Further, when the area DA2 or DB2 is also a defect area, defect information is recorded on the area DA3 or DB3. Thus, defect information is recorded on an area sequentially.

In that case, a spacing I1 between the areas DA1 and DA2, a spacing I2 between the areas DA2 and DA3, a spacing I4 between the areas DB1 and DB2 and a spacing I3 between the areas DB2 and DB3 are all selected to be equal. With this arrangement, upon reproduction, when the area DA1 is the defect area, it is sufficient that the area DA2, which is equally spaced apart from the area DA1, is reproduced. Since FIG. 10 is made based on the serial logical address, physical spacings on the disc surface of the optical disc 22 become equal. A peculiar identification data (ID) should preferably be overwritten in the defect sector in order to reliably prevent the defect sector from being reproduced.

The defect information has SDL information whose value can be updated. Accordingly, if defect information is recorded on the four positions or greater, then ID data has to be overwritten on all positions each time defect information is updated. Accordingly, the time required each time the defect information is updated is unavoidably increased and the recording area in which user data is recorded is reduced. For this reason, defect information should preferably be recorded on the proper four positions.

The defect information can be recorded on other areas than the areas DA1 and DB1 if defect information cannot accurately be recorded on all of the proper four positions of the areas DA1 and DB1, if defect information cannot accurately be recorded on three of the four positions of the areas DA1 and DB1, if defect information cannot accurately be recorded on two of the four positions of the areas DA1 and DB1 or if defect information cannot accurately be recorded on even one of the four positions of the areas DA1 and DB1

Specifically, if defect information starts being recorded on the logical track n, then as shown in FIG. 14, defect information will be recorded from the logical tracks n+0, n+1, N+2 because the defect information is recorded by effectively using 3 tracks. Similarly, if defect information starts being recorded from the logical track m, then the defect information will be recorded on the logical tracks m+0, m+1, m+2 because the defect information is recorded by effectively utilizing 3 tracks.

Then, upon reproduction, defect information is read out from the areas DA1 and DB1 initially. If defect information recorded on the four positions cannot be read out, then defect information is read out from the areas DA2 and DB2. Defect information will hereinafter be read out from areas $DA_{n-1}$ and $DB_{n-1}$ (neither area $DA_{n-1}$ nor $DB_{n-1}$ is shown in FIG. 15).

According to this embodiment, in order to prevent defect information reproduced from the defect area from being used as correct data, when defect information is recorded on another area, peculiar ID data, such as "FF" or the like, is overwritten on the defect area.

How to check a defect sector and how to record defect information before the optical disc 22 shown in FIG. 5 is shipped will be described with reference to the flowchart in FIG. 16. It is possible to check defect sector and to record defect information either by using the optical disc drive 12 shown in FIG. 5 or by using an apparatus exclusively-designed for checking defect information.

Figure 16:
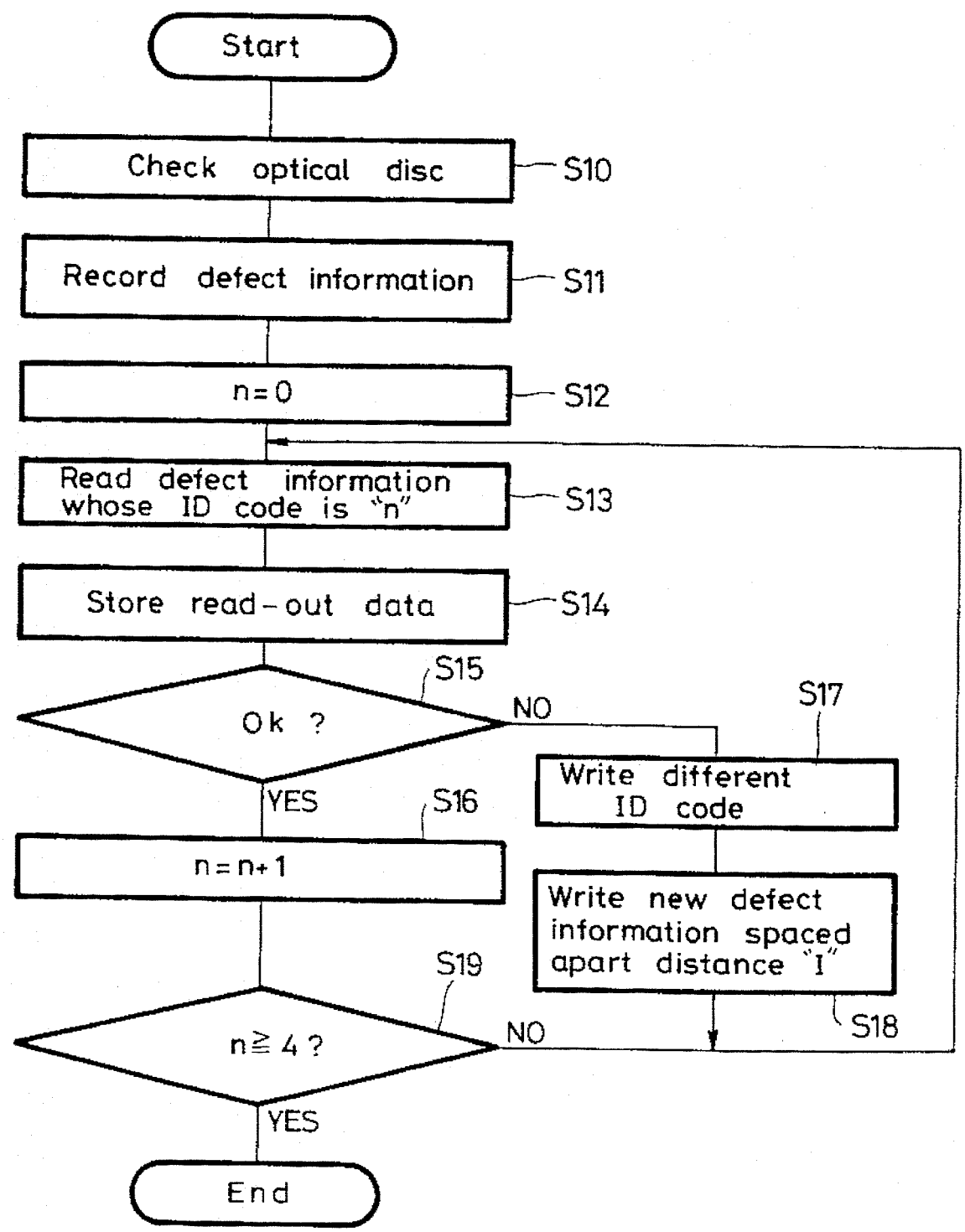
FIG. 16 is a flowchart to which reference will be made in explaining how to check a defect sector and how to record defect information before the optical disc is shipped.

Referring to FIG. 16, following the start of operation, an optical disc is checked at step S10. Specifically, the optical disc is initialized in the manufacturing process and it is determined at step S10 whether or not a defect sector exists on the optical disc. The existence of a defect sector is determined by checking whether predetermined recorded data that was previously recorded and read-out predetermined recorded data agree with each other. An address of a sector that was determined to be a defect sector is temporarily stored in a memory such as the RAM 15 or the like. The processing proceeds to the next step S11.

In step S11, defect information is recorded, i.e., defect information is recorded totally in four positions, two of which are on the outermost peripheral position and two of which are on the innermost peripheral position of the user area Ar3 of the optical disc 22. The information SDL is the list used for a defect sector which is detected after the optical disc was shipped. The information SDL is not therefore recorded in step S11 and only the information DDS and the information PDL are recorded in step S11. Then, the processing proceeds to step S12.

In step S12, "0" is substituted for n where n is the ID data for the positions at which the defect information is recorded in the four positions of the optical disc. Then, the processing proceeds to step S13.

In step S13, defect information "n" is read by the ID data. Specifically, of the defect information recorded at step S11, defect information whose ID data is "n" is read out. Then, the processing proceeds to the next step S14.

In step S14, the data thus read out is stored. Specifically, the defect information thus read out at step S13 is stored in a suitable means, such as the RAM 15 or the like. Then, the processing proceeds to step S15.

It is determined in decision step S15 whether or not a judged result is "OK". More specifically, it is determined in decision step S15 whether or not the written defect information agrees with the defect information stored in step S14.

If a YES is output at decision step S15, then the processing proceeds to step S16, wherein "1" is added to a value of the current variable n. Then, the processing proceeds to the next decision step S19. If a NO is output at decision step S15, then the processing proceeds to step S17, wherein a different ID data is written. More specifically, since it is determined in decision step S15 that the judged result is not "OK", peculiar data value, such as "FF" or the like is written as the ID data in order to reliably prevent the recorded defect information from inadvertently being used. Then, the processing proceeds to the next step S18.

In step S18, the defect information is written at the position spaced apart by a predetermined distance "I".

Specifically, new defect information is written at the position spaced apart by the distance "I" from the defect information recording position at which the read-out defect information does not agree with the written defect information. Then the processing returns to step S13 and the above-mentioned steps are repeated.

It is determined in decision step S19 whether or not the condition $n \geq 4$ is established. In this embodiment, the defect information should be correctly written at the four previously mentioned positions and therefore it is necessary to determine whether or not n becomes four or greater. If a YES is output at decision step S19, then this routine is ended. If a NO is output at decision step S19, then the processing returns to step S13 and the above-mentioned steps are repeated.

The operation which is executed when the optical disc drive 12 accesses the optical disc 22 shown in FIG. 5 will be described with reference to a flowchart of FIG. 17.

As earlier noted, when the optical disc 22 is initialized in the manufacturing process, disc information shown in FIG. 8 is recorded on the area Ar1 of every optical disc thus manufactured and defect information is recorded on the optical disc by the processing described with reference to FIG. 16.

Figure 17:
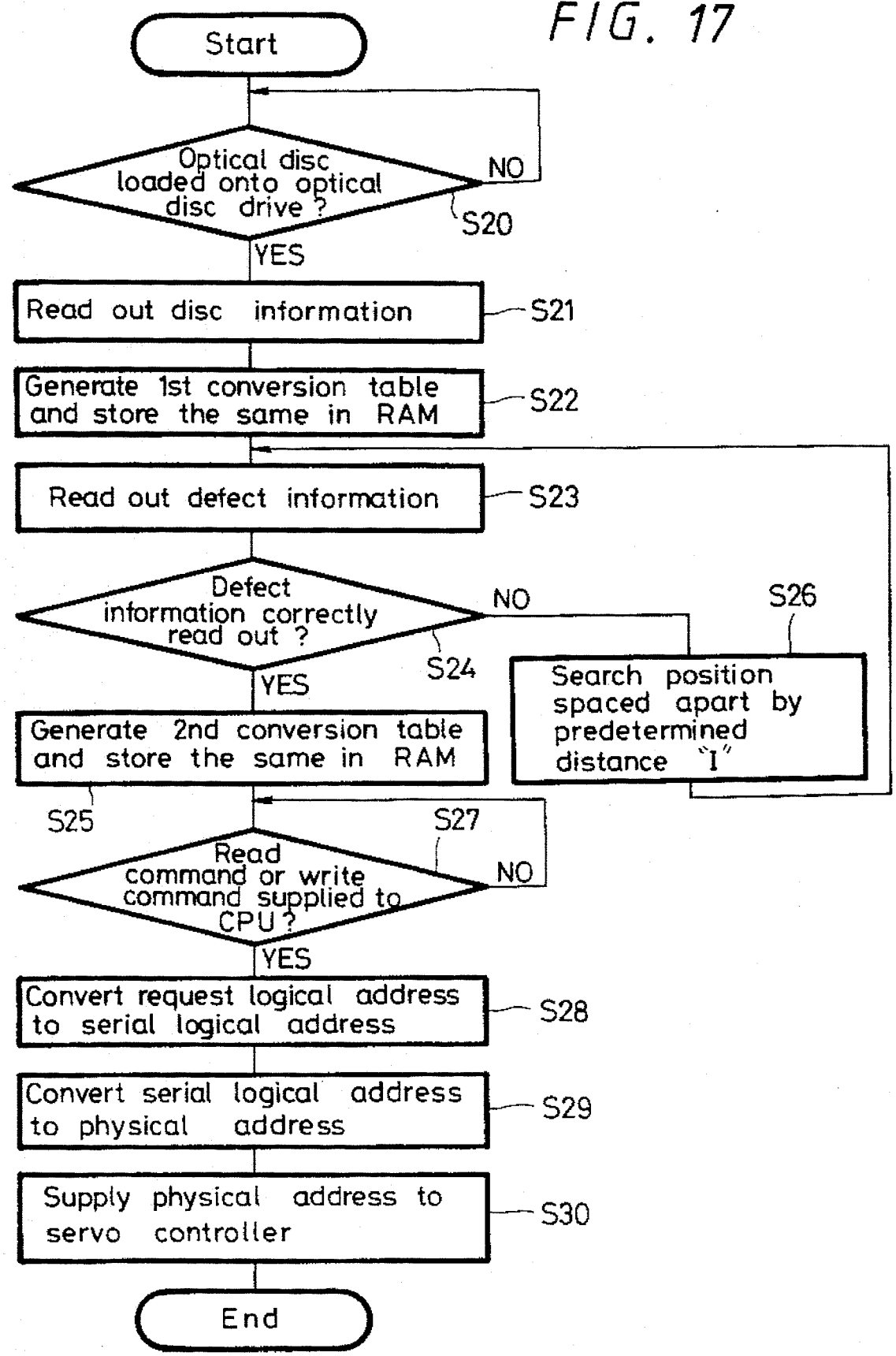
FIG. 17 is a flowchart to which reference will be made in explaining the operation of an optical disc drive when the optical disc drive accesses the optical disc.

Referring to FIG. 17, following the start of operation, it is determined in decision step S20 whether or not the optical disc 22 is loaded onto the optical disc drive 12. If a YES is output at decision step S20, then the processing proceeds to step S21, wherein disc information is read out. In the next step S22, the first conversion table is generated on the basis of the read-out disc information and stored in the RAM 15. Then, the processing proceeds to step S23, wherein defect information is read out.

It is determined in the next decision step S24 whether or not defect information is correctly read out in step S23. This decision step S24 is executed by determining whether or not ID data agree with each other.

If the defect information is not correctly read out, as represented by a NO at decision step S24, then the processing proceeds to step S26, wherein the position that is spaced apart by the predetermined distance "I" is searched. Then, the processing returns to step S23, wherein defect information is read out again. This processing loop is repeated until defect information is read out correctly. If a YES is output at decision step S24, then the processing proceeds to step S25, wherein the second conversion table is generated on the basis of the defect information obtained at step S23 and stored in the RAM 15.

In the next decision step S27, it is determined whether or not the read command or the write command including the sector No. data and the sector length data is supplied to the CPU 13 from the host computer 11 through the interface circuits 17 and 18 and the bus 14.

If a YES is output at decision step S27, then the processing proceeds to step S28, wherein the request logical address is obtained on the basis of the sector No. data, the sector length data and the offset amount based on the defect information or the like. Then, the request logical address is converted to serial logical address by using the second conversion table. In the next step S29, the serial logical address is converted to a physical address by using the first conversion table. In step S30, the physical address is supplied to the servo controller 19 and the driver unit 20 is driven under the control of the servo controller 19, thereby accessing the optical disc at the position indicated by the physical address.

Another method of recording defect information on another sector of the optical disc 22 when the defect information recording sector of the optical disc 22 is a defect sector will be described with reference to FIGS. 18 and 19.

Figure 18:
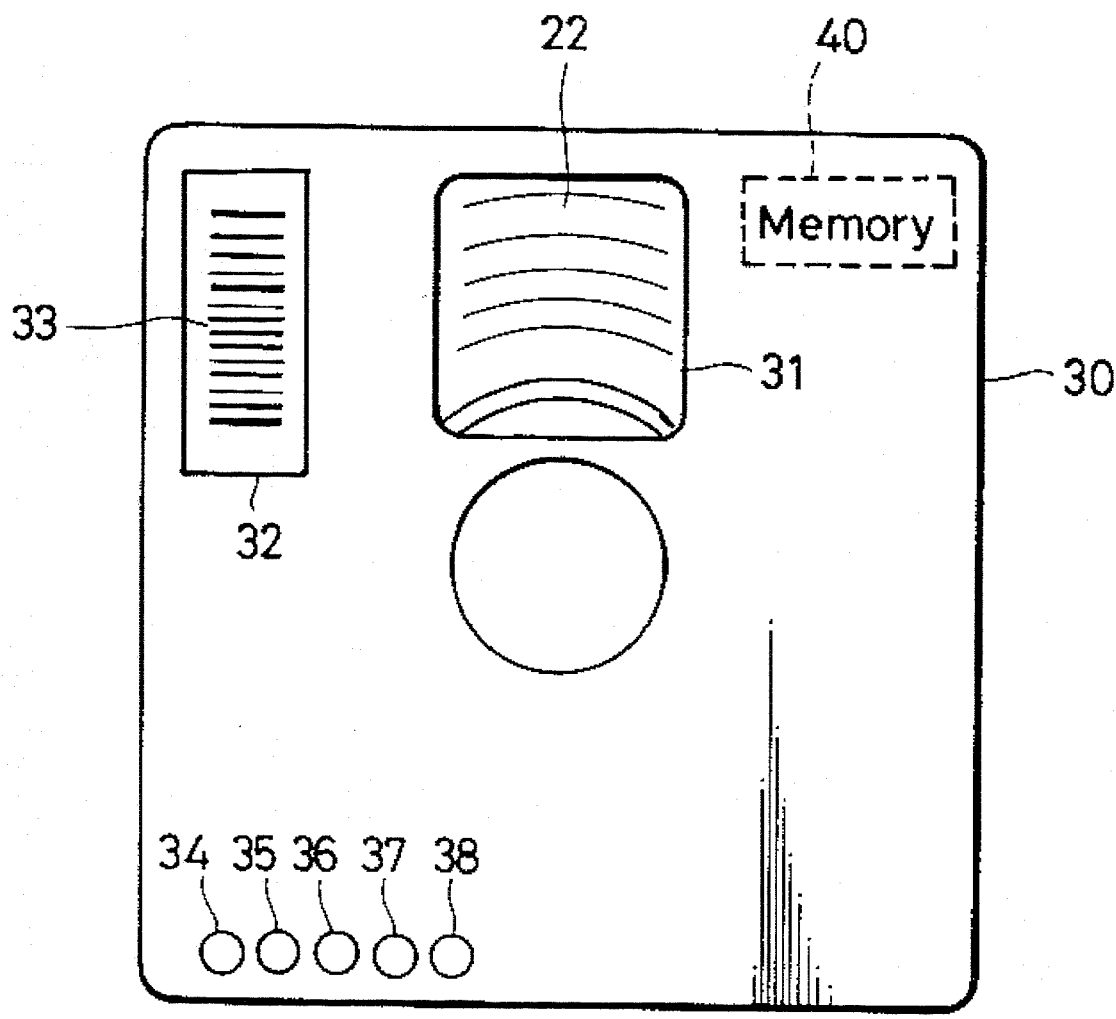
FIG. 18 is a schematic diagram used to explain a second embodiment of the present invention, which illustrates the state when the optical disc shown in FIG. 5 is accommodated into a disc cartridge.

FIG. 18 is a schematic diagram showing the state that the optical disc 22 shown in FIG. 5 is accommodated within a disc cartridge 30. In FIG. 18, reference numeral 31 designates a window portion of the disc cartridge 30. Reference numerals 34 to 38 depict holes defined on the disc cartridge. Reference numeral 33 depicts a bar code printed on a seal 32. Reference numeral 40 depicts a memory. When in use, any one of the holes 34 to 38, the bar code 33 and the memory 40 are used. For simplicity, the holes 34 to 38, the bar code 33 and the memory 40 are illustrated together with the disc cartridge 30.

Any one of the bar code 33 printed on the seal 32, the holes 34 to 38 or the memory 40 is used to store information representing the position at which defect information is recorded when the optical disc is initialized in the manufacturing process.

The use of the holes 34 to 38, the bar code 33 printed on the seal 32 pasted to the disc cartridge 30 and the memory 40 shown in FIG. 18 will be described with reference to FIGS. 5, 14, and 18 in which case the maximum values of the DAn and DBn in FIG. 14 are set to "6".

Initially, how to use the holes 34 to 38 that are defined on the disc cartridge 30 will be described. In this embodiment, the maximum values of the Dan and the Dbn are set to "6". If defect information is recorded on the DA2 and DB2 when it is determined by certifying the optical disc that the DA1 and DB1 cannot be used, only the hole 34 of the holes 34 to 38 shown in FIG. 18 is formed on the disc cartridge 30. If defect information is recorded on the DA3 and DB3 when the DA2 and DB2 cannot be used, only the hole 35 of the holes 34 to 38 shown in FIG. 18 is formed on the disc cartridge 30. This operation is similarly carried out for DA3 to DA6 and DB3 to DB6.

Specifically, the hole 34 is used for DA1 and DB1, the hole 35 is used for DA2 and DB2, the hole 36 is used for DA3 and DB3, the hole 37 is used for DA4 and DB4, and the hole 38 is used for DA5 and DB5. When the thus arranged, disc cartridge 30 is inserted into the optical disc drive 12 shown in FIG. 5. The optical disc drive 12 reads out hole information through the reading unit 24 and the interface circuit 23 shown in FIG. 5 and recognizes the recorded position of defect information based on the read-out hole information. In this case, the reading unit 24 functions as a light emitting device and a photosensing device.

When the existence of a hole is represented by "0" and the absence of a hole is represented by "1", if the maximum value of the DAn and DBn, for example, is "8", then it is sufficient that the number of holes is 3 (e.g., holes 34, 35 and 36) at maximum. Specifically, the existence and absence of a hole can provide two pieces of information and since there are three holes it is possible to obtain 2 cubed (=8) pieces of information.

The operation executed by the optical disc drive 12 when the bar code 33 is printed on the seal 32 and the seal 32 with the bar code 33 printed thereon is bonded to the disc cartridge 30 will be described below. If defect information is recorded on the DA2 and the DB2 when the DA1 and the DB1 cannot be used, then information "1", for example, is formed into the bar code 33 and this bar code 33 is printed on the seal 32. If defect information is recorded on the DA3 and DB3 when the DA2 and the DB2 cannot be used, information "2" is formed into the bar code 33 and this bar code 33 is printed on the seal 32.

Specifically, the information "1" represented on bar code 33 is used for the DA1 and DB1, the information "2" represented on the bar code 33 is used for the DA2 and the DB2, information "3" represented on the bar code 33 is used for the DA3 and the DB3, information "4" represented on the bar code 33 is used for the DA4 and the DB4, information "5" represented on the bar code 33 is used for the DA5 and the DB5, . . . , information "n" represented on the bar code 33 is used for the DAn and the DBn. When the thus arranged disc cartridge 30 is inserted into the optical disc drive 12 shown in FIG. 5, the optical disc drive 12 reads out information on the bar code 33 by the reading unit 24 and the interface circuit 23 shown in FIG. 5 and recognizes the recorded position of defect information based on the read-out bar code information. In this case, the reading unit 24 functions as a bar code reader.

While the bar code 33 is printed on the seal 32 and the seal 32 with the bar code 33 printed thereon is bonded to the disc cartridge 30 as described above, the present invention is not limited thereto and the bar code 33 may directly be provided on the disc cartridge 30 by printing, for example.

Operation of the optical disc drive 12 when the memory 40 is employed will be described below. In this case, the memory 40 should be formed of a nonvolatile memory, such as a flash memory and a RAM backed-up with a battery. When the optical disc is initialized in the manufacturing process, defect information is recorded on the optical disc 22 and address data thereof is written in the memory 40. Then, when the optical disc 22 is inserted into the optical disc drive 12, the optical disc drive 12 reads out the address data stored in the memory 40 by using the reading unit 24 and the interface circuit 23 shown in FIG. 5 and recognizes the recorded position of defect information based on the address data thus read out. In this case, the reading unit 24 functions as a reading circuit.

Since the information to be recorded is of about 3 bits as described above with reference to the holes 34 to 38, it is sufficient that the capacity of the memory 40 may be small.

As earlier noted with reference to FIG. 8, the present invention is not limited to the above-mentioned methods and it is possible to record information representing the position of the DDS on the so-called minus track after the disc is certified for the first time when the optical disc is initialized in the manufacturing process.

The operation which is executed by the optical disc drive 12 when the optical disc 22 is manufactured will be described below with reference to a flowchart of FIG. 19, in which case the memory 40 is used.

Figure 19:
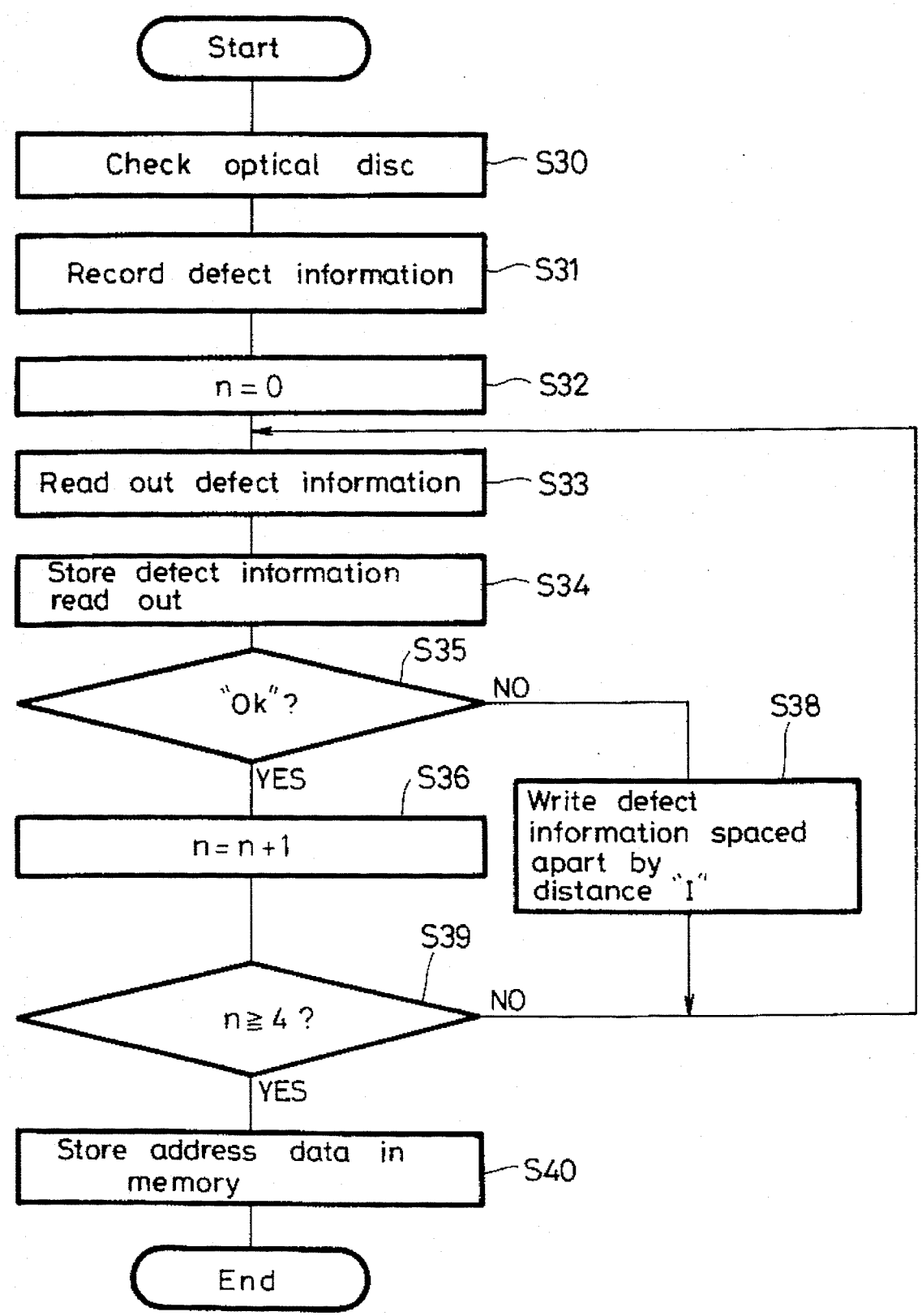
FIG. 19 is a flowchart to which reference will be made in explaining the operation executed when the optical disc is manufactured.

Referring to FIG. 19, following the start of operation, the optical disc is checked at step S30. Specifically, initialization of the optical disc is started in the manufacturing process and the existence of a defect sector on the optical disc is checked. Then, the processing proceeds to step S31.

In step S31, defect information is recorded and the processing proceeds to step S32. In step S32, "0" is substituted for "n", and the processing proceeds to step S33.

In step S33, defect information in which the ID code is "0" is read out. Then, the processing proceeds to step S34. In step S34, the data thus read out is stored, i.e., the defect information thus read out at step S33 is stored in a suitable means, such as a memory or the like. Then, the processing proceeds to the next decision step S35.

It is determined in decision step S35 whether or not a judged result is "OK". If a YES is output at decision step S35, then the processing proceeds to step S36, wherein "1" is added to the value of the current variable n. Then, the processing proceeds to the next decision step S39.

If a NO is output at decision step S35, then the processing proceeds to step S38.

In step S38, defect information is written at a position spaced apart by the distance "1". Then, the processing returns to step S33 and the above-mentioned steps are repeated.

It is determined in decision step S39 whether or not the condition n≧4 is established. If a YES is output at decision step S39, then the processing proceeds to step S40. If on the other hand a NO is output at decision step S39, then the processing returns to step S33 and the aforementioned steps are repeated.

In step S40, address data representing recorded position of defect information is stored in the memory 40 and this routine is ended.

As described above, according to this embodiment, when the optical disc 22 is manufactured, disc information composed of the start track No. the sector No. the number of sectors and DDS position information of each zone is recorded on the optical disc except in defect areas. Further, a plurality of defect information is recorded at two positions of the inner and outer peripheral portions of the user area Ar2 of the optical disc 22 with equal spacing, and information representing the recorded position of defect information is stored in the bar code 33, the holes 34 to 38, and the memory 40. Thus, when the optical disc 22 is inserted into the optical disc drive 12, the defect information is read out on the basis of the information, such as the bar code 33 or the like, and the conversion tables are generated on the basis of the defect information thus read out and the disc information.

Having described preferred embodiments of the invention with reference to the accompanying drawings, it is to be understood that the invention is not limited to those precise embodiments, and that various changes and modifications could be effected therein by one skilled in the art without departing from the spirit or scope of the invention as defined in the appended claims.

What is claimed is:

1. A method of accessing a disc-shaped recording medium comprising the steps of:
   (a) recording defect information including a first logical address data of defective sectors on said disc-shaped recording medium, said first logical address data being a serial address data assigned to all sectors including both effective sectors and defective sectors;
   (b) recording disc information containing physical recorded position information of said defect information which represents a physical data structure on said disc-shaped recording medium at a predetermined physical position;
   (c) reading out said disc information from said disc-shaped recording medium;
   (d) generating a first table using said disc information read out at step (c) which is used for address conversion between a second logical address data and a physical address data of said disc-shaped recording medium, said second logical address data being an address data assigned only to said effective sectors;
   (e) reading out said defect information using said physical recorded position information contained in said disc information read out at step (c);
   (f) generating a second table using said defect information which is used for address conversion between said first logical address data and said second logical address data;
   (g) converting said first logical address data to be accessed to said second logical address data using said second table which was generated at step (f);
   (h) converting the second address data generated at step (g) to said physical address data using said first table which was generated at step (d); and
   (i) accessing said disc-shaped recording medium using the physical address data generated at said step (h).

2. A method of accessing a disc-shaped recording medium according to claim 1, wherein there is a step between steps (f) and (g) of adding an extraneous request address with an offset of a predetermined physical position at which said defect information is recorded so as to generate said first logical address data.

3. A method of accessing a disc-shaped recording medium according to claim 1, wherein a recording format of said disc-shaped recording medium is a zone CAV system.

4. A method of accessing a disc-shaped recording medium according to claim 1, wherein said defect information includes:

first defect information generated by a first defect area processing system in which defective sectors are replaced by adjacent sectors; and second defect information generated by a second defect area processing system in which defective sectors are replaced by sectors provided within a replacement area of a physical position which is preassigned on said disc-shaped recording medium.

5. A method of accessing a disc-shaped recording medium according to claim 1, wherein step (a) further comprises the steps of:

determining whether or not said recorded defect information is recorded correctly; and re-recording said defect information on said disc-shaped recording medium at a position spaced by a predetermined distance from the position at which said defect information was recorded if said defect information is not correctly recorded.

6. A method of accessing a disc-shaped recording medium according to claim 5, wherein step (a) further comprises the step of:

recording information representing that said defect information is invalid if said recorded defect information is not recorded correctly.

7. A method of accessing a disc-shaped recording medium comprising the steps of:
   (a) reading out disc information from a disc-shaped recording medium in which defect information based on a first logical address and said disc information containing recorded position information of said defect information which represents a physical data structure are recorded;
   (b) generating a first table using said disc information read out at step (a) which is used for address conversion between a second logical address data and a physical address data of said disc-shaped recording medium, said second logical address data being an address data assigned only to effective sectors of the disc-shaped recording medium;
   (c) reading out said defect information using said physical recorded position information contained in said disc information read out at step (a);
   (d) generating a second table using said defect information which is used for conversion between said first logical address data and said second logical address data;

(e) converting said first logical address data to said second logical address data using said second table;

(f) converting said second logical address data to be accessed to said physical address data using said first table; and (g) accessing said disc-shaped recording medium using said physical address data.

8. A method of accessing a disc-shaped recording medium according to claim 7, wherein there is a step between steps (d) and (e) of adding an extraneous request address with an offset of a predetermined physical position at which said defect information is recorded so as to generate said first logical address data.

9. A method of accessing a disc-shaped recording medium according to claim 7, wherein a recording format of said disc-shaped recording medium is a zone CAV system.

10. A method of accessing a disc-shaped recording medium according to claim 7, wherein said defect information includes:

first defect information generated by a first defect area processing system in which defective sectors are replaced by adjacent sectors; and second defect information generated by a second defect area processing system in which defective sectors are replaced by sectors provided within a replacement area of a physical position which is preassigned on said disc-shaped recording medium.

11. A method of accessing a disc-shaped recording medium comprising the steps of:

(a) recording defect information on said disc-shaped recording medium including a first logical address data of defective sectors, said first logical address data being a serial logical address data assigned to all sectors including both effective and defective sectors;

(b) recording on a predetermined physical location of the disc-shaped recording medium disc information containing recorded physical position information of said defect information which represents a physical data structure;

(c) reading out said disc information from said disc-shaped recording medium;

(d) reading out said defect information using said physical recorded position information contained in said disc information read out at step (c);

(e) generating a first table using said defect information which is used to covert said first logical address data into a second logical address data, said second logical address data being an address data assigned only to said effective sectors;

(f) generating a second table using said disc information read out at step (c) which is used to convert said second logical address data into a physical address data of said disc-shaped recording medium;

(g) using said first table to convert said first logical address data to be accessed into said second logical address data;

(h) using said second table to convert said second logical address data into said physical address data; and (i) accessing said disc-shaped recording medium using the physical address data generated at step (h).

* * * * *